H. WIKING & C. G. SÖDERLUND.
BALL BEARING.
APPLICATION FILED DEC. 31, 1913.
1,136,077.
Patented Apr. 20, 1915.
2 SHEETS—SHEET 1.
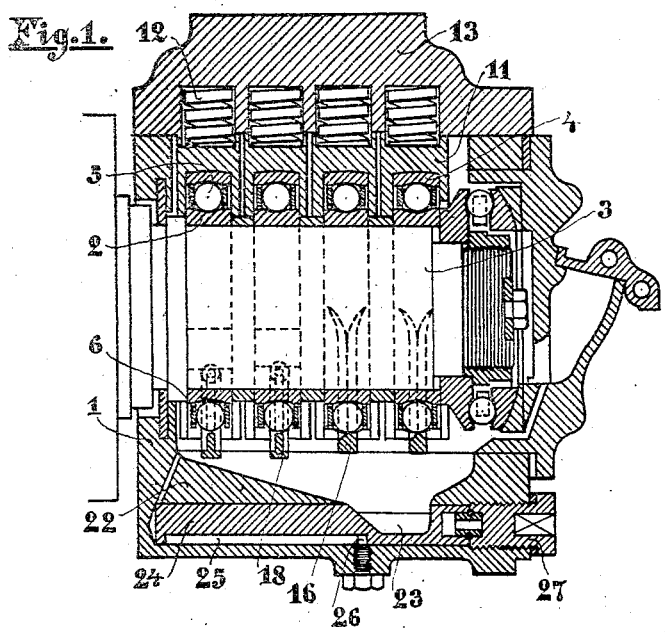
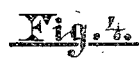
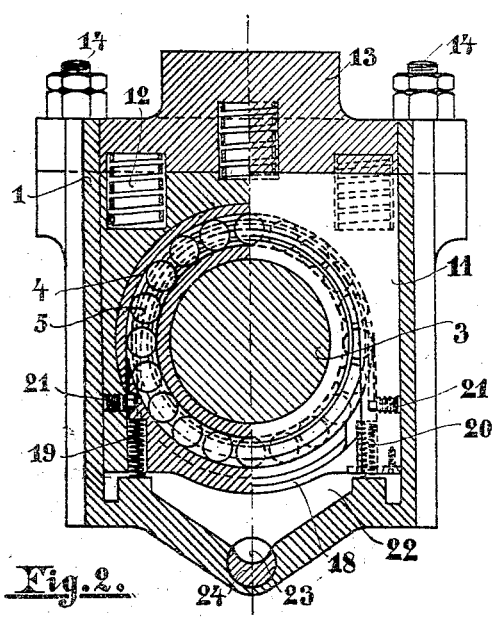
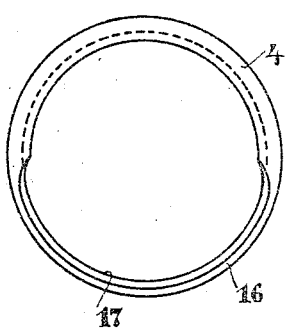
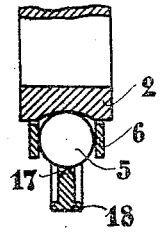

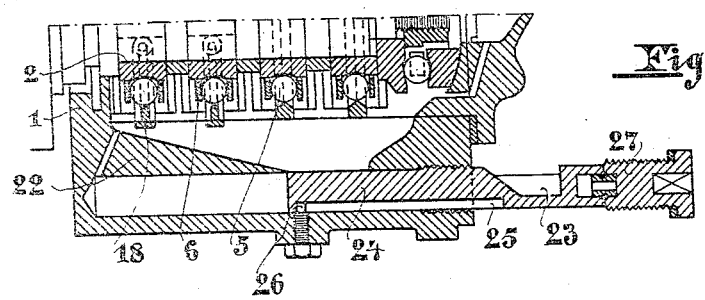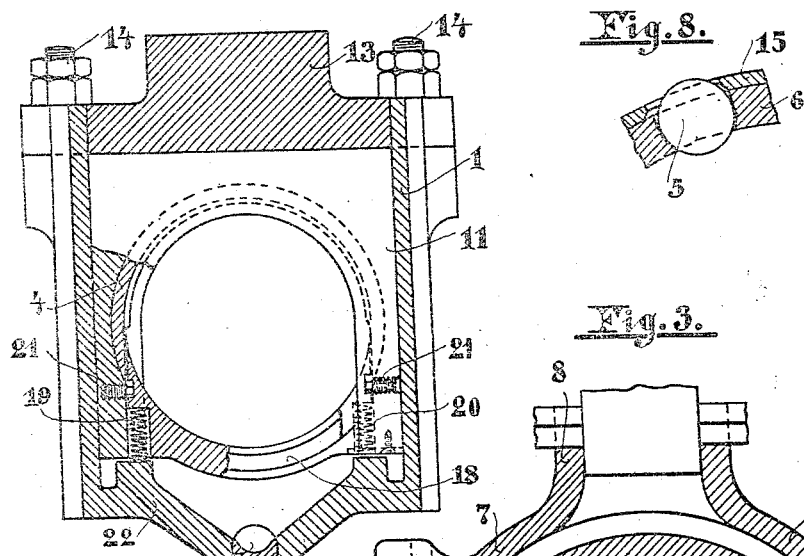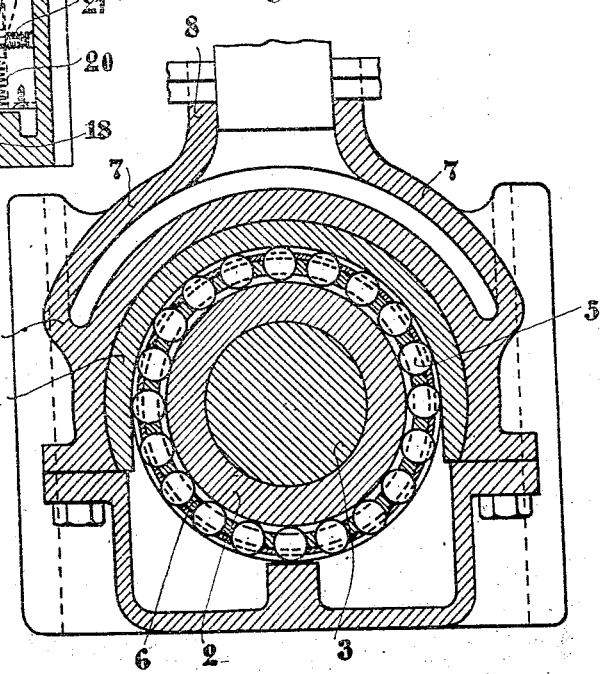

UNITED STATES PATENT OFFICE.

HENRIK WIKING AND CARL GUSTAF SÖDERLUND, OF GOTTENBORG, SWEDEN.

BALL-BEARING.

1,136,077.     Specification of Letters Patent.    Patented Apr. 20, 1915.

Application filed December 31, 1913. Serial No. 809,750.

*To all whom it may concern:*

Be it known that we, HENRIK WIKING and CARL GUSTAF SÖDERLUND, citizens of Sweden, residing at Gottenborg, in the Province of Gottenborg and Bohus and Kingdom of Sweden, have invented new and useful Improvements in Ball-Bearings for Shafts Loaded from the One Side, as Axle-Boxes or the like, of which the following is a specification.

Our invention relates to ball bearings for axles or shafts loaded from only one side, particularly car axle boxes; and it consists in the peculiar and advantageous ball bearing hereinafter described and definitely claimed.

In the drawings accompanying and forming part of this specification Figure 1 is a longitudinal section of a car axle ball bearing box. Fig. 2 is a cross section of the same box. Fig. 3 is a cross section of a car axle ball bearing box on a somewhat modified construction. Fig. 4 is a side elevation of an outer ring or ball race of the bearing. Fig. 5 is an end elevation of the same part as illustrated in Fig. 4. Fig. 6 is a part of a cross section through the outer and inner ring on an enlarged scale. Fig. 7 is an end view of the axle box with the outer ring partly in section. Fig. 8 is a sectional view of the ball, cage on an enlarged scale. Fig. 9 is a similar view of the same part in another working position. Fig. 10 is a sectional view of the inspection device.

The ball bearing, as already known, is built up in an axle box 1 and consists in an inner ring or ball race 2 fixed to the axle journal 3, an outer ring or ball race 4, and, between the rings, one or more rows of balls 5, held by a ball cage 6 provided with a plurality of small chambers, each containing one of the balls 5.

According to one mode of construction, the inner ring 2 constitutes a solid socket and the ball cage 6 a cylinder shaped sleeve (Fig. 3). From the upper part of the box proper there extend two tongue-shaped portions 7, each of which is connected with the box 1 at a suitable distance from the line of resultant of the load, *i. e.* at a point about 60° off the top of the bearing. Above the top of the box the tongues are connected with a bracket 8 for the car supporting spring. The tongue shaped portions 7 may, if desired, consist in loosely fitted feet bolted to the box, and they may be directed either straight upward or incline sidewise.

The outer ring or ball race 4 is semicylindrical and is placed in a cavity in the box 1.

In consequence of the tongue shaped construction of the upper portion of the box, the load from the car spring is transmitted to the bearing on the two sides, thus causing the box to slightly deflect, and the semicylindrical outer ball race to closely embrace the axle journal, pressing down the balls 5 toward the inner ball race, on, practically speaking, the whole upper half part of the bearing instead of only on a single ball or the top of the bearing.

According to the second mode of construction, the outer ring or race 4 is embraced by a slightly elastic horse-shoe shaped casing 11 placed in the upper part of the box. Preferably the outer ring 4 as well as the inner ring 2 and the casing 11, instead of being each a single piece, may be divided into a plurality of narrow strips each containing only a single row of balls.

To produce a uniform load on all the balls of the upper half part of the bearing, the casings 11 are pressed toward the upper half race by means of spiral springs 12 disposed between the casings and a cap piece 13, supporting the car spring, and secured to the box by screw bolts 14. Preferably the springs 12 are so arranged in relation to the center line of the axle journal 3 that there is one spring straight above the center and one or more springs symmetrically placed on each side of the perpendicular line through the center, Fig. 2. The tension of the springs 12 may be chosen so that the casing 11 and thereby the upper portion of the outer ring 4 is caused to bend slightly around the upper bearing surface for the above mentioned purpose. This bending may of course be very little and consequently does not cause unduly high strains in the material.

To prevent the balls from falling down when passing the lower half portion of the race, any one of the following devices may be used.

In the first mode of construction the small chambers mentioned of the ball cage 6 are cylindrical and arranged in circumferential as well as longitudinal rows. A protecting sleeve or mantle 15 provided with a plurality of holes spaced exactly equal to the chambers in the cage and of the same diameter as the balls, is placed around the cylindrical cage 6. When fitting up the bearing the mantle 15 is rotated on the cage 6 until each of its holes corresponds with a hole chamber in the cage, and the balls are put through the holes in the mantle 15 into the respective chamber in the cage (Fig. 3). After that, the mantle is turned a little on the cage, so that the holes in the mantle receive an eccentric position relatively to the balls, Fig. 8, and will then retain the latter within their respective chambers, allowing a free rolling movement of the balls but preventing them from falling down as long as said balls remain unbroken.

According to another mode of construction, the chambers in the cage are full cylinders and the balls when passing the lower half portion of the race are supported by a narrow wedge-shaped ring 16 one under each row of balls with the edge 17 bearing against the balls Fig. 1, 4 and 5. This lower ring may either form a part of the outer ring 4 or may be a separate ring half 18, which is carried at each side of the casing 11 by the spiral springs 19, 20, Figs. 2 and 7, so as to execute a soft pressure against the balls situated beneath the journal. On each side of the outer ring 4 there is a set screw 21 projecting into a slot in the side of the ring 18, securing said ring 18 from falling down as well as the outer ring 4 from being turned in the box and simultaneously limiting the upward movement of the ring 18.

As long as the balls remain unbroken they are prevented from falling down by the rings 16 or 18 when passing the lower portion of the race. As soon, however, as a ball gets crushed the pieces fall down out of the cylindrical chambers in the cage, this because the breadth of the rings 16 or 18 is considerably smaller than the diameter of the balls.

If the ring 16 is made a part of the outer ring 4 (as shown by the two rings on the right in Fig. 1) the ring portion 16 may preferably be slightly eccentric so as to effect the desired elastic bearing against the balls.

In the bottom 22 of the box 1 beneath the axle journal 3, there is a cavity 23 formed in a slide 24, which closes oil-tight in the box. This slide can be drawn out to such an extent that the cavity 23 arrives outside the box (Fig. 10), in which position the cavity as well as the box remain oil-tight closed, owing to the rear portion of the slide, in order to save the oil in the bottom of the box. The drawn out position of the slide is limited by a stopping device, which consists for instance in a slot 25 in the slide and a stationary pin 26 projecting into the slot and bearing against the end of the latter. When fully closed the slide may be secured by means of a screw connection 27 or the like.

Should a ball 5 be damaged the broken parts fall through the hole of the mantle 15 beside the edge of the ring 16 or 18 and down into the cavity 23. By drawing out the slide 24, it will thus immediately be recognized if one or more of the balls have been broken and that it is necessary to repair the bearing. In order to prevent the parts of the broken balls from becoming jammed between the edge of the cavity 22 and the front wall of the cavity 23 thus preventing the drawing of the slide, the bottom of the cavity 23 is inclined backward so that any ball part resting thereon and reaching above the edge of the cavity 23 may be forced up on the inclined wall of the box cavity.

The axial load as already known is taken up by end ball bearings.

The purpose of the elastic bearings of the ring 16 respectively 18 is to retain the outer ring or ball race in engagement with the balls even at the lower portion of the bearing, causing them to rotate against the inner ball race also when passing the under portion of the race, whereby a uniform wear is effected, and the removing of the broken parts of the balls is facilitated.

When mounting the bearing it must be observed that the springs 12 are not too strong to prevent the cap piece 13 from touching the casing 11 as soon as the bearing becomes loaded by the weight of the car. Unloaded, however, a narrow space ought to be left between the casing 11 and the cap piece 13. The springs 12 consequently merely bring about the mentioned slight bending of the casing but by no means take up the actual load on the bearing.

It will be gathered from the foregoing that in connection with a single circular series of balls we employ ball-surrounding means, arranged in the same vertical plane as the single series of balls and comprising upper and lower portions, the upper or loaded portion being constructed and arranged to be deflected around the balls on the top of the journal, and the lower or unloaded portion being constructed and arranged to rest under and in the same vertical plane as the circular series of balls and to support perfect balls and at the same time permit broken balls to freely gravitate from the series.

Having now particularly described and ascertained the nature of our said invention and in what manner the same is to be performed, we declare that what we claim is:—

1. In a ball bearing, the combination of a box, a journal arranged therein, a circular series of balls, means in the box and bearing on the upper balls of the series and con structed and arranged to enable said balls to support the box, a ball cage surrounding the journal and containing the balls, means opposed to the lower balls of the series and constructed and arranged to prevent intact balls from dropping from the cage and to allow broken balls to fall therefrom, a slide having a limited movement in the lower portion of the box and also having a receptacle arranged to receive broken balls and pieces of balls, and means detachably connected with the box for normally holding the slide against outward movement.

2. In a ball-bearing, the combination of a box, a journal arranged therein, a circular series of balls, means in the box and bearing on the upper balls of the series and constructed and arranged to enable said balls to support the box, a ball cage surrounding the journal and containing the balls, means opposed to the lower balls of the series and constructed and arranged to prevent intact balls from dropping from the cage and to allow broken balls to fall therefrom, a slide arranged in the lower portion of the box and having a longitudinal groove and also having a receptacle arranged to receive broken balls and pieces of balls, and a screw connection threaded in the box and connected in swiveled manner with the outer end of the slide.

3. In a ball bearing, the combination of a box, a journal arranged therein, a circular series of balls, means in the box and bearing on the upper balls of the series and constructed and arranged to enable said balls to support the box, a ball cage surrounding the journal and containing the balls, a curvilinear ball-support having a narrow edge opposed to the lower balls of the series, and means in the lower portion of the box constructed and arranged to receive broken balls or ball pieces.

4. In a ball bearing, the combination of a box, a journal arranged therein, a circular series of balls, a ball cage surrounding the journal and containing the balls, a ring surrounding the balls and opposed thereto, the lower portion of the ring being wedge-shaped in cross-section and having a sharp edge opposed to the lower balls, and means in the lower portion of the box arranged to receive broken balls and pieces of balls.

5. In a ball bearing, the combination of a box, a journal arranged therein, a circular series of balls, a ball cage surrounding the journal and containing the balls, means in the box and bearing on the upper balls and constructed and arranged to enable said balls to support the box, a curvilinear, yieldingly-supported ball-support having a narrow edge opposed to the lower balls, and means in the lower portion of the box arranged to receive broken balls or ball pieces.

6. In a ball bearing, the combination of a box, a journal therein, a circular series of balls around the journal, and ball-surrounding means, arranged in the box and disposed in the same vertical plane as the circular series of balls and comprising upper and lower portions, the upper or loaded portion being constructed and arranged to be deflected around the balls on the top of the journal, and the lower or unloaded portion being constructed and arranged to rest under and in the same vertical plane as the circular series of balls and to support perfect balls and yet permit broken balls to freely gravitate from the series.

7. In a ball bearing, the combination of a box, a journal therein, a circular series of balls around the journal, and ball-surrounding means, arranged in the box and disposed in the same vertical plane as the circular series of balls and comprising upper and lower portions, the upper or loaded portion being constructed and arranged to be deflected around the balls on the top of the journal, and the lower or unloaded portion being provided with a narrow edge opposed to and arranged under the balls and in the same plane as the vertical center thereof to support perfect balls and yet permit broken balls to freely gravitate from the series.

8. In a ball bearing, the combination of a box having upwardly reaching tongue-shaped portions thereon at points at the sides of the upper portion of the box, a journal arranged in the box, a circular series of balls around the journal, and ball-surrounding means, arranged in the box, at right-angles to said tongue-shaped portions, and disposed in the same vertical plane as the circular series of balls and comprising upper and lower portions, the upper or loaded portion being constructed and arranged to be deflected around the balls on the top of the journal, and the lower or unloaded portion being constructed and arranged to rest under and in the same vertical plane as the circular series of balls and to support perfect balls and yet permit broken balls to freely gravitate from the series.

9. In a ball bearing, the combination of a box, a journal therein, a circular series of balls around the journal, ball-surrounding means arranged in the box and disposed in the same vertical plane as the circular series of balls and comprising upper and lower portions, the upper or loaded portion being constructed and arranged to be deflected around the balls on the top of the journal and the lower or unloaded portion being constructed and arranged to rest under and in the same vertical plane as the circular series of balls and to support perfect balls and yet permit broken balls to freely gravitate from the series, a cap-piece connected with the box, a casing arranged on the upper portion of the ball-surrounding means, and resilient means interposed between the cap-piece and said casing.

10. In a ball bearing, the combination of a box, a journal therein, a circular series of balls around the journal, and a ring surrounding and arranged in the same plane as the circular series of balls and having an upper loaded portion constructed and arranged to be deflected on the upper balls and also having a lower portion on which is a narrow edge portion arranged in the same plane as the vertical centers of the balls and contacting with and supporting the lower balls.

In testimony whereof we have hereunto set our hands in presence of two subscribing witnesses.

HENRIK WIKING.
CARL GUSTAF SÖDERLUND.

Witnesses:
  ILSE LINDAN,
  ERIC WIDHOLM.